(12) United States Patent
Fujimori

(10) Patent No.: US 12,182,374 B2
(45) Date of Patent: Dec. 31, 2024

(54) CONTROL METHOD FOR DISPLAYED GROUPED OBJECTS

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 115 days.

(21) Appl. No.: 17/683,590

(22) Filed: Mar. 1, 2022

(65) Prior Publication Data

US 2022/0276749 A1 Sep. 1, 2022

(30) Foreign Application Priority Data

Mar. 1, 2021 (JP) ................................ 2021-031444

(51) Int. Cl.
G06F 3/0481 (2022.01)
G06F 3/0354 (2013.01)
G06F 3/04845 (2022.01)
G06F 40/166 (2020.01)
G06F 40/169 (2020.01)
H04N 9/31 (2006.01)

(52) U.S. Cl.
CPC ........ G06F 3/0481 (2013.01); G06F 3/04845 (2013.01); *G06F 3/03542* (2013.01); *G06F 3/03545* (2013.01); *G06F 40/166* (2020.01); *G06F 40/169* (2020.01); *H04N 9/3179* (2013.01); *H04N 9/3194* (2013.01)

(58) Field of Classification Search
CPC .. G06F 3/0481; G06F 3/04845; G06F 3/0488; G06F 3/03542; G06F 3/03545; G06F 40/169; G06F 40/166
USPC ............................................... 715/230, 268, 764
See application file for complete search history.

(56) References Cited

U.S. PATENT DOCUMENTS

| | | | |
|---|---|---|---|
| 6,549,948 B1 | 4/2003 | Sasaki et al. | |
| 10,540,906 B1 * | 1/2020 | Fieldman | H04L 12/1822 |
| 2004/0255242 A1 * | 12/2004 | Price | G06F 40/169 |
| | | | 715/201 |
| 2014/0354695 A1 | 12/2014 | Sakai | |
| 2018/0285042 A1 * | 10/2018 | Kato | H04N 1/00228 |
| 2019/0050664 A1 * | 2/2019 | Yang | G06F 3/011 |
| 2019/0147402 A1 * | 5/2019 | Sitrick | H04L 12/1822 |
| | | | 705/301 |
| 2020/0226320 A1 * | 7/2020 | Biran | G06F 40/114 |

(Continued)

FOREIGN PATENT DOCUMENTS

| | | |
|---|---|---|
| JP | H08-163556 A | 6/1996 |
| JP | 2013-222280 A | 10/2013 |
| WO | WO13/105443 A | 7/2013 |

*Primary Examiner* — Ting Z Lee
(74) *Attorney, Agent, or Firm* — Dority & Manning, P.A.

(57) ABSTRACT

A control method for a display apparatus includes displaying a first image based on an input first image signal on a display surface when a first operation on the display surface is detected, displaying a first drawing image corresponding to the first operation on the display surface, when a second operation to select the first image and the first drawing image on the display surface is received, registering the first image and the first drawing image as a first group, and when a third operation to select the first group on the display surface is received, executing first processing corresponding to the third operation.

4 Claims, 15 Drawing Sheets

(56) References Cited

U.S. PATENT DOCUMENTS

2021/0019911 A1\* 1/2021 Kusakabe .............. G06F 3/011
2021/0271380 A1\* 9/2021 Sakamoto ........... G06F 3/04812

\* cited by examiner

CONTROL METHOD FOR DISPLAYED GROUPED OBJECTS

The present application is based on, and claims priority from JP Application Serial Number 2021-031444, filed Mar. 1, 2021, the disclosure of which is hereby incorporated by reference herein in its entirety.

BACKGROUND

1. Technical Field

The present disclosure relates to a control method for a display apparatus and a display apparatus.

2. Related Art

In related art, a display apparatus detecting a position on a display surface pointed by a pointer and displaying an image on the display surface based on the detected pointed position is known.

For example, an apparatus disclosed in JP-A-2013-222280 receives image data transmitted from an image output apparatus and projects an image based on the image data as a projection image on a projection surface, and drawing is performed over the projection image.

However, the apparatus disclosed in JP-A-2013-222280 independently manages the image data received from the image output apparatus and drawing data drawn by a user on the projection surface. Accordingly, there is a problem that it may be impossible to integrally process the received image data and the drawing data.

SUMMARY

An aspect of the present disclosure is directed to a control method for a display apparatus including displaying an image based on an input image signal on a display surface, detecting an operation of a pointer on the display surface, displaying a drawing image corresponding to the detected operation on the display surface, when an operation to select the image and the drawing image displayed on the display surface is received, registering the selected image and drawing image in a group, and, when an operation on the image and the drawing image registered in the group is received, executing processing corresponding to the received operation.

Another aspect of the present disclosure is directed to a display apparatus including a receiving unit receiving an image signal, a display unit displaying an image based on the received image signal on a display surface, a detection unit detecting an operation of a pointer on the display surface, and a control unit generating a drawing image corresponding to the operation detected by the detection unit and displaying the generated drawing image on the display surface, wherein, when receiving an operation to select the image and the drawing image displayed on the display surface, the control unit registers the selected image and drawing image in a group, and, when receiving an operation on the image and the drawing image registered in the group, executes processing corresponding to the received operation.

DESCRIPTION OF EXEMPLARY EMBODIMENTS

As below, an embodiment of the present disclosure will be explained with reference to the accompanying drawings.

Figure 1:
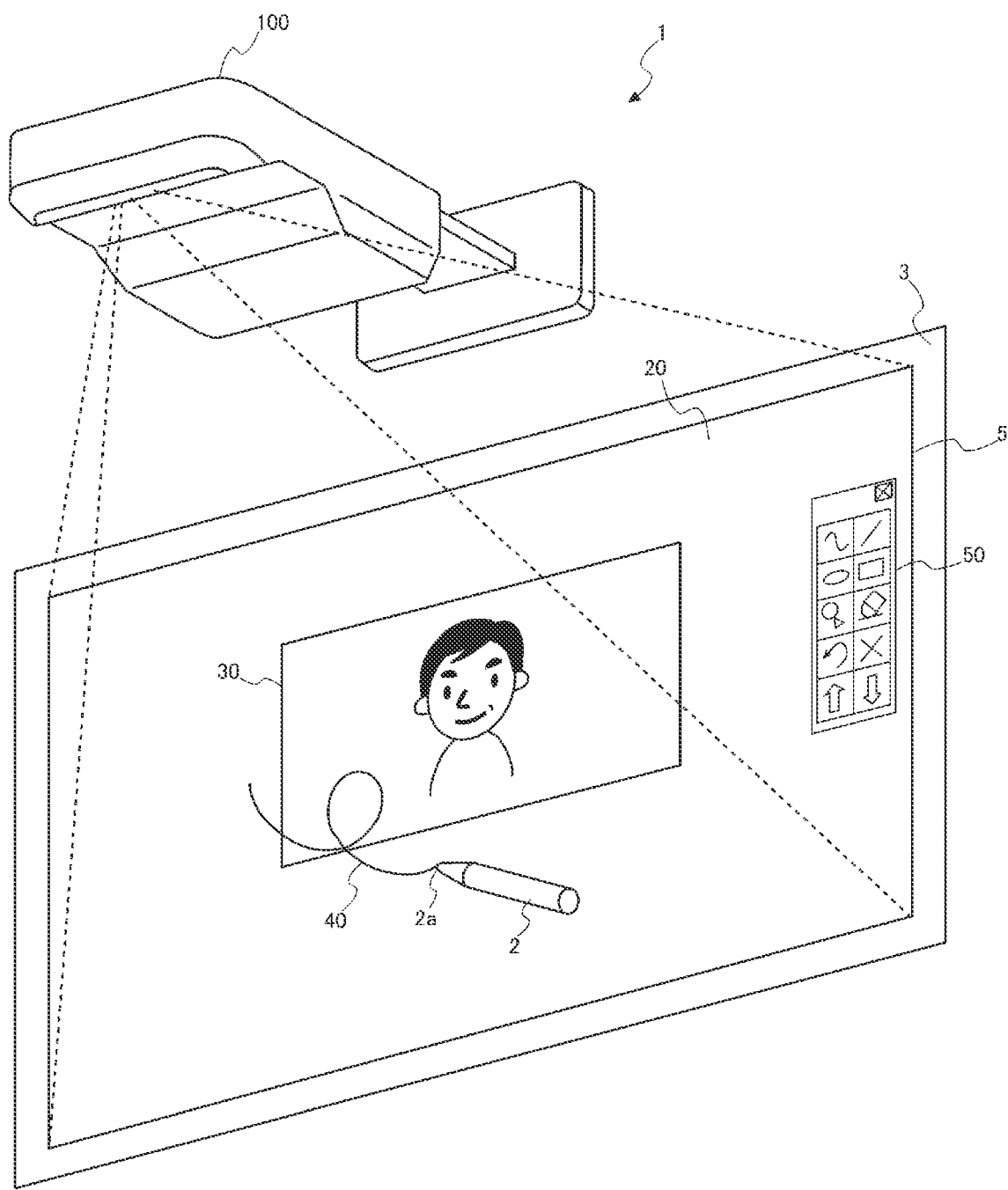
FIG. 1 is a perspective view showing a schematic configuration of a display system.

FIG. 1 is a perspective view showing a schematic configuration of a display system 1 to which the present disclosure is applied.

As shown in FIG. 1, the display system 1 includes a projector 100 as a display apparatus and a light emitting pen 2 as a pointer. The projector 100 projects an image light on a projection surface 3 and displays a projection image 20 as an image corresponding to the image light on the projection surface 3. An area of the projection surface 3 in which the projector 100 projects the image light is referred to as "projection area 5". The projection surface 3 corresponds to a display surface.

The projection image 20 contains an image based on an image signal supplied from an external image supply apparatus 10 and an image having a line drawn along a trajectory of a pointed position on the projection surface 3 pointed by the light emitting pen 2. Hereinafter, an image based on the image signal is referred to as "image object 30". An image having a line drawn along a trajectory of a pointed position of the light emitting pen 2 is referred to as "drawing object 40". The drawing object 40 corresponds to a drawing image. Further, the projection image 20 contains an OSD (On Screen Display) menu image etc. Hereinafter, the OSD menu image is referred to as "OSD image 50".

The projector 100 shown in FIG. 1 is fixed to a wall surface and projects the projection image 20 toward the projection surface 3 placed along the same wall. For the projection surface 3, e.g. a screen, a whiteboard, or the like may be used, however, a configuration projecting an image on the wall surface itself may be employed. As an installation form of the projector 100, a base may be placed at a fixed distance from the projection surface 3 and the projector 100 may be installed on the base.

The light emitting pen 2 includes a light emitting portion 2a that emits infrared light, and a pressure detection portion that detects pressure on the projection surface 3, i.e., a touch on the projection surface 3 by the tip of the light emitting pen 2. The illustration of the pressure detection portion is omitted. The light emitting portion 2a repeatedly brinks on and off in a predetermined emission sequence while the light emitting pen 2 operates. The light emitting portion 2a changes the emission sequence according to whether or not the projection surface 3 is touched. Accordingly, the projector 100 may recognize whether or not the projection surface 3 is touched by the light emitting pen 2 based on the emission sequence of the light emitting portion 2a. Note that the light emitting pen 2 may emit a light in another wavelength range than that of the infrared light.

The projector 100 includes an imaging unit 120. The imaging range of the imaging unit 120 contains the projection area 5. The projector 100 detects a light emitted by the light emitting pen 2 from the captured image and detects a position of the detected light as a pointed position pointed by the light emitting pen 2. Further, the projector 100 senses whether or not the projection surface 3 is touched based on the emission sequence of the detected light. Then, the projector 100 displays a pointer (not shown) in the detected pointed position and displays the drawing object 40 having a line drawn along a trajectory of the pointed position with the projection surface touched.

Figure 2:
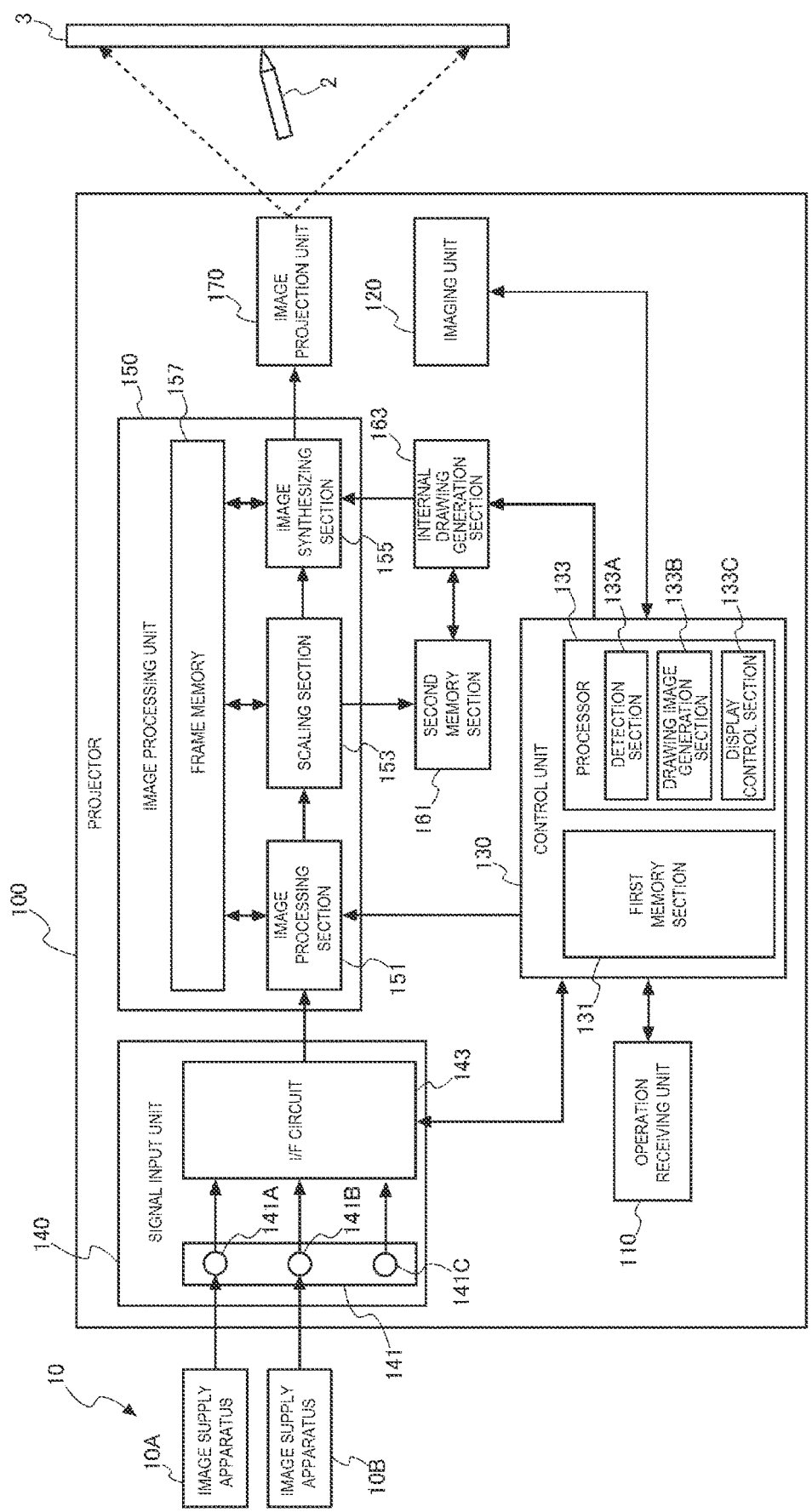
FIG. 2 is a block diagram showing a schematic configuration of a projector.

FIG. 2 is a block diagram showing a schematic configuration of the projector 100.

The schematic configuration of the projector 100 is explained with reference to FIG. 2.

The projector 100 includes an operation receiving unit 110, the imaging unit 120, a control unit 130, a signal input unit 140, an image processing unit 150, a second memory section 161, an internal drawing generation section 163, and an image projection unit 170.

The operation receiving unit 110 includes a plurality of operation keys for the user to give various instructions to the projector 100. The operation keys of the operation receiving unit 110 include a power key for switching on and off of power and a menu key for display of a menu image for various settings. Further, the operation keys include arrow keys for selection of items on the menu image, input selection keys for selection of input terminals 141A, 141B, 141C receiving image signals, etc. When the user operates the various operation keys of the operation receiving unit 110, the operation receiving unit 110 outputs operation signals corresponding to the details of operation of the operation keys to the control unit 130.

Further, the operation receiving unit 110 may function as a receiving unit receiving an infrared signal transmitted from a remote controller. The remote controller issues an infrared signal according to the details of the operation by the user, and the operation receiving unit 110 receives the infrared signal. The operation receiving unit 110 outputs a signal corresponding to the details of the operation indicated by the received infrared signal to the control unit 130.

The imaging unit 120 is a camera including an imaging device (not shown) such as a CCD (Charge Coupled Device) sensor or a CMOS (Complementary Metal Oxide Semiconductor) sensor. The imaging unit 120 has an infrared transmission filter that absorbs visible light and transmits the infrared light, and images infrared light emitted from the light emitting pen 2 via the infrared transmission filter. The imaging unit 120 repeats imaging of the range containing the projection area 5 on the projection surface 3 and sequentially outputs captured images as imaging results to the control unit 130 according to the control by the control unit 130. The imaging unit 120 corresponds to a detection unit.

The control unit 130 is a computer device including a first memory section 131 and a processor 133. The control unit 130 performs integrated control of the operation of the projector 100 by the processor 133 operating according to a control program stored in the first memory section 131.

The first memory section 131 includes memories such as a RAM (Random Access Memory) and a ROM (Read Only Memory). The RAM is used for temporary storage of various kinds of data etc., and the ROM stores control programs for controlling the operation of the projector 100, various kinds of setting information, etc.

The first memory section 131 stores calibration data. The calibration data refers to data in which coordinates of a captured image of the imaging unit 120 are associated with coordinates of a frame memory 157. A two-dimensional coordinate system is set for the captured image and the frame memory 157, and the coordinates of the frame memory 157 corresponding to the coordinates on the captured image are uniquely specified by the calibration data.

The processor 133 is an arithmetic processing device including a CPU (Central Processing Unit) and a MPU (Micro Processing Unit). The processor 133 controls the individual parts of the projector 100 by executing the control program. The processor 133 can be formed using a single processor or using a plurality of processors. The processor 133 may be formed using part or all of the first memory section 131 or an SoC integrated with another circuit. Alternatively, the processor 133 may be formed by a combination of a CPU executing a program and a DSP executing predetermined arithmetic processing. Alternatively, all of the functions of the processor 133 may be incorporated in hardware or configured using a programmable device.

The control unit 130 of the projector 100 includes a detection section 133A, a drawing image generation section 133B, and a display control section 133C as functional blocks realized by the control program. These functional blocks show the functions realized by the processor 133 executing the control program in blocks for descriptive purposes.

The detection section 133A detects the infrared light emitted by the light emitting pen 2 from the captured images captured by the imaging unit 120. The detection section 133A regards an image having brightness equal to or larger than a predetermined threshold and a size within a predetermined range of images of infrared light contained within the captured image as a light emitted by the light emitting pen 2 and detects the position thereof as a pointed position by the light emitting pen 2. Further, the detection section 133A determines the emission sequence of the light emitting pen 2 based on the captured images acquired at a plurality of times and senses whether or not the projection surface 3 is touched. The detection section 133A corresponds to a detection unit.

The drawing image generation section 133B generates the drawing object 40 having a line drawn along a trajectory of the pointed position based on the detection result of the detection section 133A. When the user performs a drawing operation to draw on the projection surface 3 with the light emitting pen 2, that is, the pointed position changes with the projection surface 3 touched by the light emitting pen 2, the drawing image generation section 133B generates drawing data representing the drawing object 40 based on the trajectory of the pointed position. The drawing image generation section 133B generates the drawing data in e.g. a vector format and stores the data in the first memory section 131 and sequentially updates the data over time. Further, the drawing image generation section 133B outputs the generated drawing data to the display control section 133C.

The display control section 133C converts the drawing data in the vector format into a raster format for display of the drawing object 40 generated by the drawing image generation section 133B and outputs the data to the internal drawing generation section 163. Further, the display control section 133C performs control to delete and switch the displayed drawing object 40.

Furthermore, the display control section 133C outputs converted image data, the drawing data, and coordinate information of the frame memory 157 in which OSD data, which will be described later, is expanded to the internal drawing generation section 163.

The signal input unit 140 receives image signals supplied from the external image supply apparatus 10 including a computer and various video apparatuses. The signal input unit 140 includes the plurality of input terminals 141 as image interfaces coupled to the image supply apparatus 10 and an interface circuit 143. In the embodiment, a case where the signal input unit 140 includes the three input terminals 141 of the input terminals 141A, 141B, 141C is explained, however, the number of input terminals 141 of the signal input unit 140 is not limited to three. Hereinafter, the interface is abbreviated as I/F. FIG. 2 shows an example in which an image supply apparatus 10A and an image supply apparatus 10B are coupled to the projector 100. The signal input unit 140 corresponds to a receiving unit.

The input terminals 141A, 141B, 141C of the signal input unit 140 include e.g. the following terminals:
  an HDMI terminal (registered trademark) for coupling to
    a video apparatus or a computer compliant to HDMI
    (High Definition Multimedia Interface);
  a computer terminal for input of analog RGB signals
    mainly from a computer; and
  a video terminal for input of composite signals mainly
    from a video apparatus.

The I/F circuit 143 extracts image data and synchronizing signals contained in the image signals input from the input terminals 141A, 141B, 141C. The I/F circuit 143 outputs the extracted image data and synchronizing signals to the image processing unit 150 and outputs the extracted synchronizing signals to the control unit 130. The image processing unit 150 processes the image data with respect to each frame in synchronization with the input synchronizing signals. The control unit 130 controls the respective parts of the projector 100 in synchronization with the input synchronizing signals. The image data may be moving image data or still image data.

When the projector 100 and the image supply apparatus 10 are coupled by an HDMI cable, the I/F circuit 143 extracts an EDID (Extended Display Identification Data) signal contained in the HDMI signal as the image signal. The I/F circuit 143 outputs the extracted EDID signal to the control unit 130.

The image processing unit 150 includes an image processing section 151, a scaling section 153, an image synthesizing section 155, and the frame memory 157.

The image processing section 151 expands the image data input from the signal input unit 140 in the frame memory 157 and performs various kinds of processing on the image data expanded in the frame memory 157 according to the control by the control unit 130. For example, the image processing section 151 performs processing of adjusting brightness and contrast of images and adjusting a color mode on the image data.

The color mode refers to a mode for adjusting the tone of the image projected on the projection surface 3. For example, as the color modes, the projector 100 has a dynamic mode suitable for viewing in a light environment, a living mode suitable for viewing in a half-light environment, a theater mode suitable for movie watching in a dark environment.

Correction parameters corresponding to the color mode are input from the control unit 130 to the image processing section 151. The image processing section 151 adjusts the color mode of the image data by correction such as gamma correction on the image data expanded in the frame memory 157 using the input correction parameters.

The scaling section 153 performs reduction processing of converting resolution of the image data expanded in the frame memory 157 and reducing the size of the image data. The image data generated by the reduction processing is referred to as "converted image data". The scaling section 153 stores the generated converted image data in the second memory section 161. The converted image data stored in the second memory section 161 is updated by the scaling section 153. When new image data is input from the image processing section 151, the scaling section 153 performs the reduction processing on the input image data, stores the converted image data generated by the reduction processing in the second memory section 161, and updates the converted image data.

Further, when the plurality of image supply apparatuses 10A, 10B are coupled to the projector 100, the scaling section 153 respectively generates converted image data with reduced resolution of the image data extracted from the image signals supplied from these image supply apparatuses 10A, 10B. The scaling section 153 stores the generated converted image data in the second memory section 161.

The second memory section 161 includes a memory e.g. a RAM (Random Access Memory). The second memory section 161 stores the converted image data reduction-processed by the scaling section 153.

The internal drawing generation section 163 includes a GPU (Graphics Processing Unit). The internal drawing generation section 163 generates image data of the OSD image 50 to be displayed with the image data according to the control by the control unit 130. Hereinafter, the image data of the OSD image 50 is referred to as "OSD data". The OSD image 50 includes a pointer displayed in the pointed position and a menu image. In the menu image, a plurality of icons corresponding to commands that can be executed by the projector 100 are displayed.

The drawing data generated by the control unit 130 is input to the internal drawing generation section 163. The internal drawing generation section 163 stores the input drawing data in the second memory section 161.

The internal drawing generation section 163 has a function of converting the resolution of the converted image data stored in the second memory section 161 and changing the size of the image projected on the projection surface 3.

The internal drawing generation section 163 converts the resolution of the converted image data into resolution corresponding to a display size set by the operation of the light emitting pen 2. The user may operate the light emitting pen 2 to enlarge and reduce the size of the image displayed on the projection surface 3.

Hereinafter, the image displayed on the projection surface 3 based on the converted image data reduction-processed by the scaling section 153 is referred to as "thumbnail image 60". Further, the internal drawing generation section 163 changes the resolution of the converted image data according to an instruction by the user. The image displayed on the projection surface 3 based on the enlarged or reduced converted image data is referred to as "image object 30".

The internal drawing generation section 163 outputs the converted image data, the drawing data, and the OSD data read out from the second memory section 161 to the image synthesizing section 155. In this regard, the internal drawing generation section 163 also outputs the coordinate information representing the coordinates of the frame memory 157 in which the converted image data, the drawing data, and the OSD data are expanded to the image synthesizing section 155.

When the plurality of image supply apparatuses 10A, 10B are coupled to the projector 100 and the image signals are supplied from these image supply apparatuses 10A, 10B, the internal drawing generation section 163 respectively reads out the converted image data corresponding to the image supply apparatuses 10A, 10B. The internal drawing generation section 163 outputs the read out converted image data with the OSD data and the drawing data to the image synthesizing section 155.

The image synthesizing section 155 expands the input OSD data, drawing data, and converted image data in the coordinates of the frame memory 157 represented by the coordinate information and generates image data as a source of the projection image 20. The image synthesizing section 155 reads out the generated image data from the frame memory 157 and outputs the read out image data to the image projection unit 170.

Figure 3:
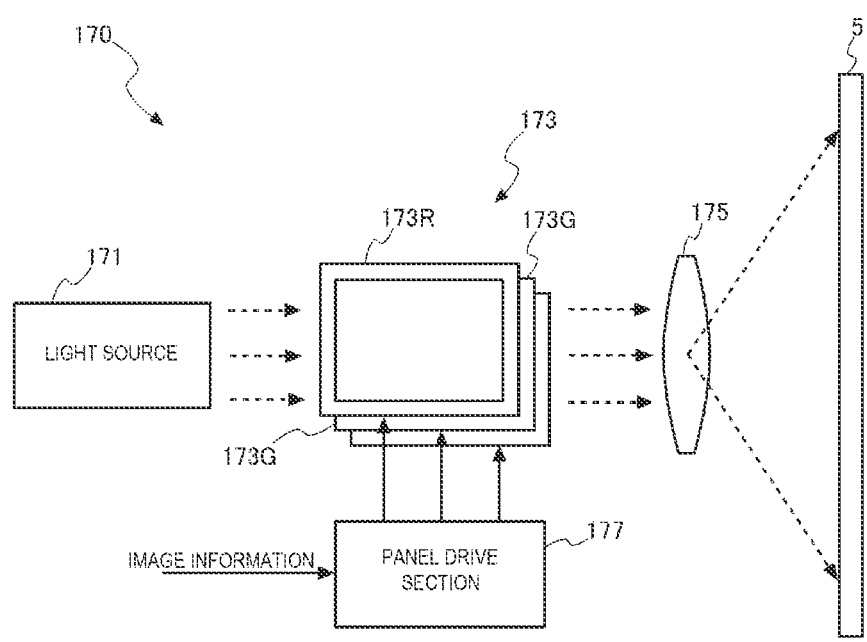
FIG. 3 is a block diagram showing a schematic configuration of an image projection unit.

FIG. 3 is a block diagram showing a schematic configuration of the image projection unit 170. The image projection unit 170 corresponds to a display unit.

The image projection unit 170 includes a light source 171, three liquid crystal panels 173R, 173G, and 173B as light modulation devices 173, an optical unit 175, and a panel drive section 177.

The image projection unit 170 modulates a light output from the light source 171 and generates an image light, and enlarges and projects the generated image light on the projection surface 3 using the optical unit 175.

The light source 171 includes a discharge light source lamp such as a super high-pressure mercury lamp and a metal halide lamp or a solid-state light source such as a light emitting diode and a semiconductor laser. The light output from the light source 171 is entered into the liquid crystal panels 173R, 173G, and 173B. Each of the liquid crystal panels 173R, 173G, and 173B includes a transmissive liquid crystal panel in which liquid crystal is enclosed between a pair of transparent substrates. In each liquid crystal panel, a pixel area containing a plurality of pixels arranged in a matrix form is formed, and drive voltages can be applied to the liquid crystal with respect to the respective pixels.

The panel drive section 177 applies drive voltages according to the input image data to the respective pixels of the pixel area and sets the respective pixels at light transmission rates according to the image data. The light output from the light source 171 is transmitted through the pixel areas of the liquid crystal panels 173R, 173G, and 173B and modulated with respect to each pixel and image lights according to the image data are formed with respect to each color light. The formed image lights of the respective colors are combined with respect to each pixel by a color combining system (not shown) into an image light representing a color image and enlarged and projected on the projection surface 3 by the optical unit 175.

Next, the image projected on the projection surface 3 and the operation by the light emitting pen 2 will be explained.

When the image supply apparatus 10 is coupled to the signal input unit 140 and supply of the image signal is started from the coupled image supply apparatus 10, the signal input unit 140 extracts the image data contained in the received image signal and outputs the extracted image data to the image processing unit 150. The image processing unit 150 performs reduction processing on the image data by the scaling section 153 and stores the reduction-processed image data as the converted image data in the second memory section 161.

The control unit 130 controls the internal drawing generation section 163, the image synthesizing section 155, and the image projection unit 170 to display the thumbnail image 60 as the image based on the converted image data on the projection surface 3.

Figure 4:
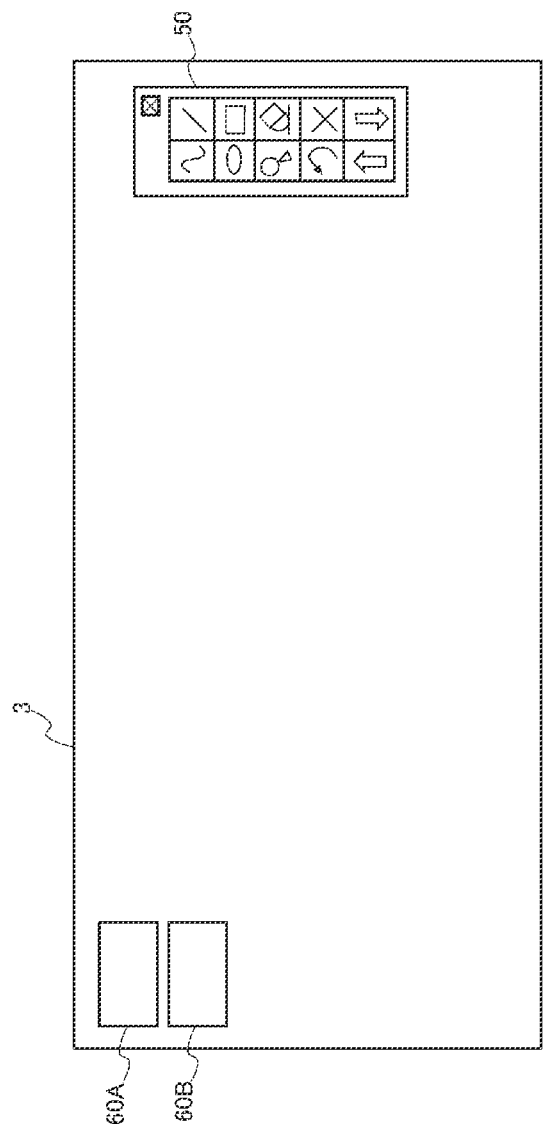
FIG. 4 shows thumbnail images displayed in a reference position.

FIG. 4 shows thumbnail images 60 displayed in a reference position.

The control unit 130 controls the internal drawing generation section 163 to display the thumbnail images 60 in a preset reference position. The preset reference position may be e.g. an upper left area of the projection surface 3. Alternatively, a plurality of reference positions may be set as the preset reference positions and priorities may be set for the set plurality of reference positions. For example, the reference positions may be set in the upper, lower, left, and right four corners of the projection surface 3 and priorities may be respectively set for the positions in the four corners. FIG. 4 shows a state in which a thumbnail image 60A based on the image signal supplied from the image supply apparatus 10A and a thumbnail image 60B based on the image signal supplied from the image supply apparatus 10B are displayed on the projection surface 3.

When the projection image 20 is already displayed in the reference position, the control unit 130 detects an area in which the projection image 20 is not projected and displays the thumbnail image 60 in the detected area of the projection surface 3. For example, when the image object 30 is displayed in the reference position, the control unit 130 displays a newly displayed thumbnail image 60 not to overlap with the image object 30.

Figure 5:
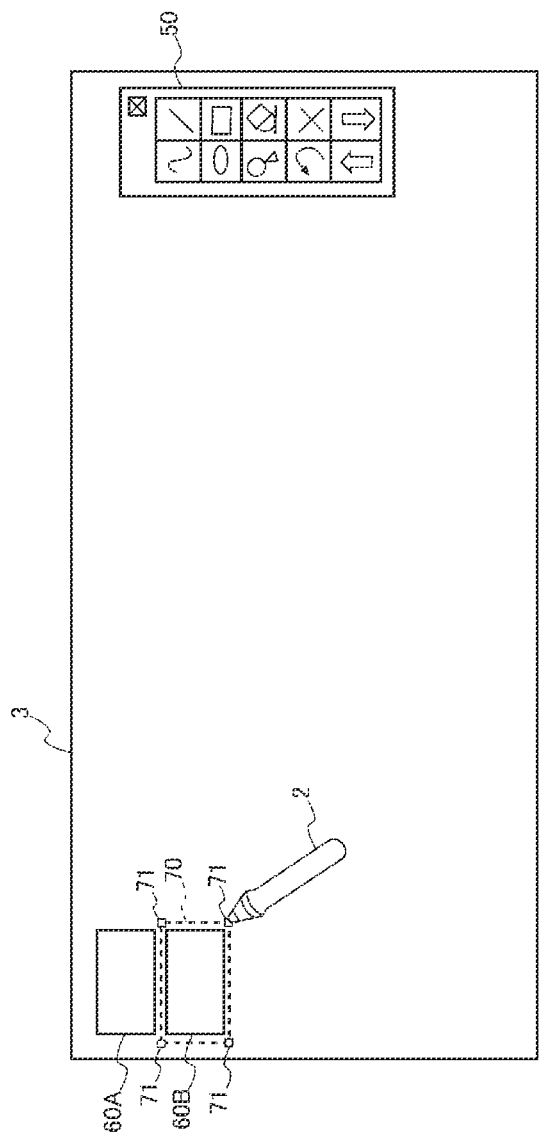
FIG. 5 shows a state in which one of the thumbnail images is selected.

FIG. 5 shows a state in which the thumbnail image 60B is selected by the operation of the light emitting pen 2.

Next, an operation when an operation to select the displayed thumbnail image 60 and an operation to enlarge the display size of the selected thumbnail image 60 are received will be explained.

The user touches the position on the projection surface 3 where the thumbnail image 60 desired to be selected is displayed with the light emitting pen 2. Alternatively, the user may enclose the thumbnail image 60 with the light emitting pen 2. FIG. 5 shows the state in which the thumbnail image 60B is selected by the operation of the light emitting pen 2.

The control unit 130 detects the pointed position on the projection surface 3 touched with the light emitting pen 2 from the captured image of the imaging unit 120 and specifies the thumbnail image 60B displayed in the detected pointed position. When determining that the thumbnail image 60B is selected, the control unit 130 displays a FIG. 70 surrounding the thumbnail image 60B. In four corners of the FIG. 70, operators 71 receiving operations to enlarge and reduce the size of the image and rotate the image are displayed.

The enlarging operation refers to e.g. an operation to touch the operator 71 with the light emitting pen 2 and move the touching light emitting pen 2 to the outside of the thumbnail image 60B. The reducing operation refers to an operation to touch the position of the operator 71 with the light emitting pen 2 and move the touching light emitting pen 2 to the inside of the thumbnail image 60B.

Figure 6:
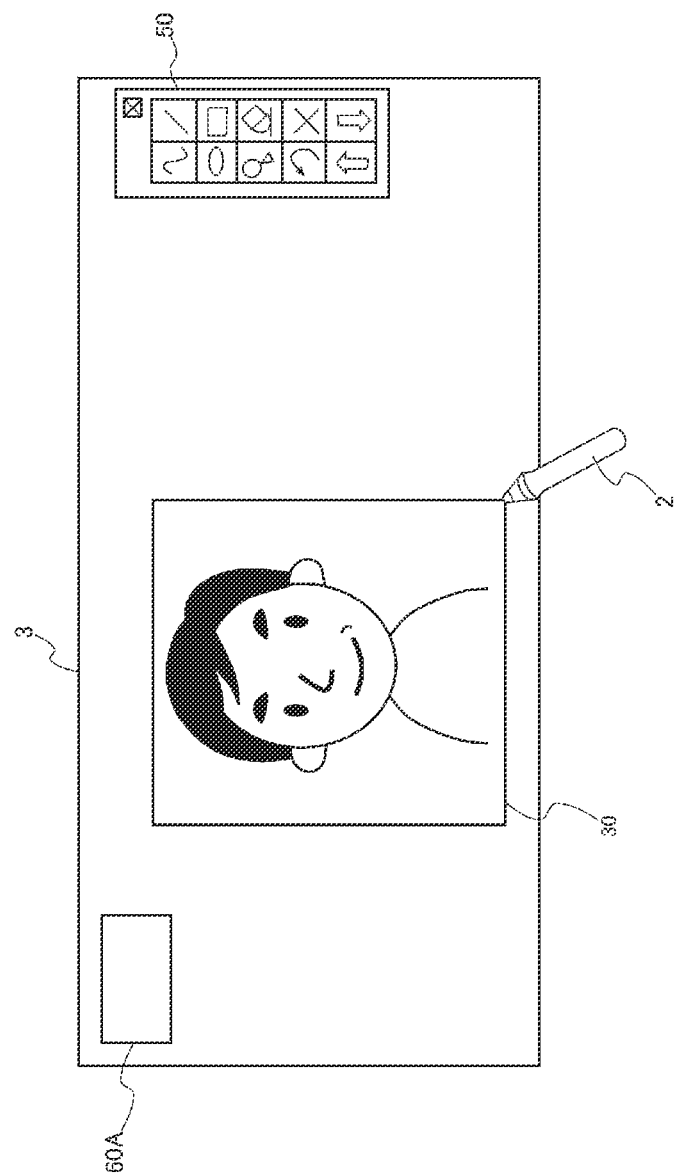
FIG. 6 shows a state in which the size of the thumbnail image is enlarged.

FIG. 6 shows a state in which the size of the thumbnail image 60B is enlarged by the operation of the light emitting pen 2.

When receiving the enlarging operation to enlarge the size of the thumbnail image 60B by the operation of the light emitting pen 2, the control unit 130 instructs the internal drawing generation section 163 on the converged image data as the source of the selected thumbnail image 60B and the converted resolution of the converged image data.

The internal drawing generation section 163 converts the resolution of the converged image data designated by the control unit 130 into the designated resolution. The internal drawing generation section 163 outputs the converted image data having the converted resolution with the OSD data and the drawing data to the image synthesizing section 155.

The image synthesizing section 155 expands the input converged image data, OSD data, and drawing data in the frame memory 157 and generates image data for display as the projection image 20 on the projection surface 3. The image synthesizing section 155 reads out the image data expanded in the frame memory 157 and outputs the read out image data to the image projection unit 170. The image projection unit 170 generates an image light based on the input image data and projects the image light on the projection surface 3, and thereby, the selected thumbnail image 60B is enlarged to the display size designated by the user and displayed as the image object 30 on the projection surface 3.

When an operation to enlarge or reduce the display size of the image object 30 is received, the control unit 130 also instructs the internal drawing generation section 163 on the converged image data corresponding to the selected image object 30 and the converted resolution of the converged image data.

The internal drawing generation section 163 converts the resolution of the converged image data designated by the control unit 130 into the resolution designated by the control unit 130. The internal drawing generation section 163 outputs the converged image data having the converted resolution with the OSD data and the drawing data to the image synthesizing section 155. Then, the image synthesizing section 155 expands the input image data in a frame memory 155A, reads out and outputs the expanded image data from the frame memory 155A to the image projection unit 170, and thereby, the display size of the image object 30 is enlarged or reduced.

Figure 7:
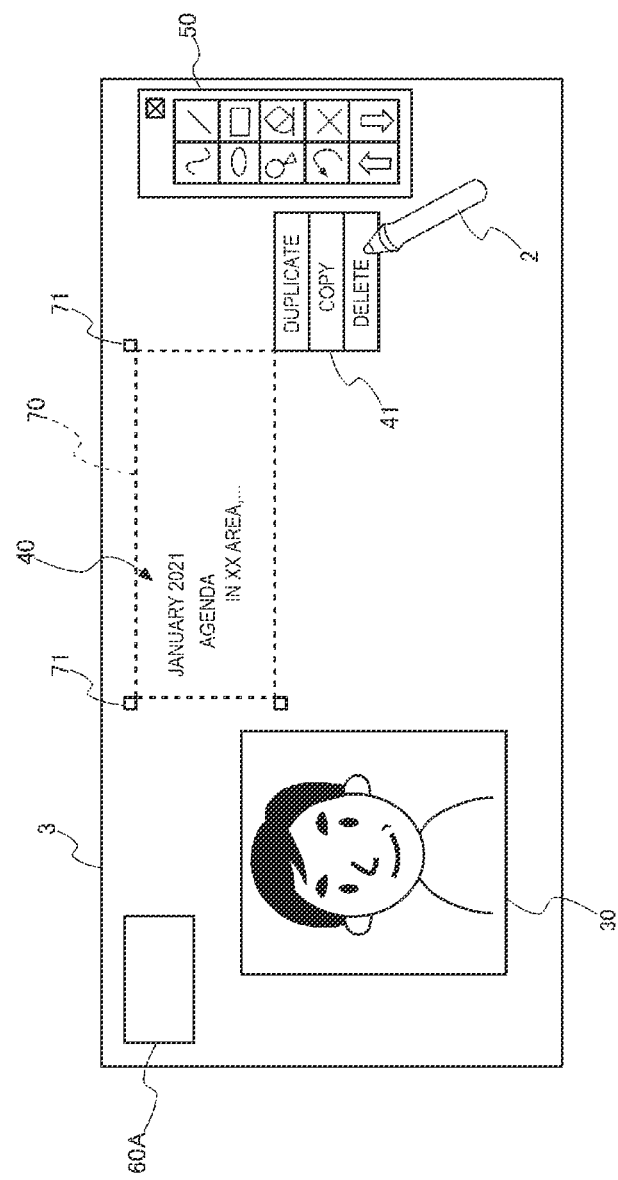
FIG. 7 shows a state in which a drawing object is selected.

FIG. 7 shows a state in which the drawing object 40 is selected.

Next, an operation of the drawing object 40 will be explained.

The user moves the light emitting pen 2 in contact with the projection surface 3 and draws a character, a sign, an image, or the like desired to be displayed on the projection surface 3.

The control unit 130 detects a trajectory of the pointed position of the light emitting pen 2 from the captured images of the imaging unit 120 and generates drawing data corresponding to the detected trajectory of the pointed position. The control unit 130 converts the generated drawing data into a vector format and outputs with the coordinate information of the frame memory 157 in which the drawing data is expanded to the internal drawing generation section 163. The internal drawing generation section 163 controls the image synthesizing section 155 to expand the drawing data in the coordinates of the frame memory 157 represented by the input coordinate information. The image synthesizing section 155 reads out the image data expanded in the frame memory 157 and outputs the read out image data to the image projection unit 170. The image projection unit 170 projects an image light corresponding to the input image data on the projection surface 3, and thereby, the character, the sign, the image, or the like corresponding to the trajectory of the light emitting pen 2 is displayed on the projection surface 3.

Further, when desiring to duplicate, copy, or delete the drawing object 40 displayed on the projection surface 3, the user encloses the drawing object 40 with the light emitting pen 2.

When the inside of the trajectory of the pointed position of the light emitting pen 2 detected from the captured images is the display position of the drawing object 40, the control unit 130 determines that the drawing object 40 is selected.

The control unit 130 displays the FIG. 70 surrounding the determined drawing object 40. The control unit 130 displays the operators 71 in the four corners of the FIG. 70 and displays a first operation menu 41. The first operation menu 41 contains operation commands of duplicate, copy, and delete.

The duplicate command refers to a command to display duplication of the selected drawing object 40 on the projection surface 3. When the duplicate command is selected, the control unit 130 acquires a coordinate range of the frame memory 157 in which the drawing object 40 is expanded with reference to the calibration data. Then, the control unit 130 outputs an instruction to duplicate, duplication source information representing the coordinate range of the frame memory 157 to duplicate, and duplication destination information representing a coordinate range of the frame memory 157 to expand the duplicated image data to the internal drawing generation section 163.

The internal drawing generation section 163 controls the image synthesizing section 155 to generate duplication of the image data expanded in the range of the frame memory 157 represented by the duplication source information in the range of the frame memory 157 represented by the duplication destination information.

The range of the frame memory 157 represented by the duplication destination information may be e.g. on the right side adjacent to the range of the frame memory 157 represented by the duplication source information or a preset position. Alternatively, the range of the frame memory 157 represented by the duplication destination information may be a position of the frame memory 157 corresponding to the position designated by the user operating the light emitting pen 2.

The image synthesizing section 155 expands the duplication of the image data in the frame memory 157, and then, reads out and outputs the image data expanded in the frame memory 157 to the image projection unit 170. The image projection unit 170 projects an image light corresponding to the input image data on the projection surface 3, and thereby, the duplication of the drawing object 40 designated by the operation of the light emitting pen 2 is displayed on the projection surface 3.

The copy command refers to a command to copy the drawing data of the selected drawing object 40. When the copy command is selected, the control unit 130 acquires a coordinate range of the frame memory 157 in which the drawing object 40 is expanded with reference to the calibration data. The control unit 130 outputs an instruction to copy and range information representing the coordinate range of the frame memory 157 to create a copy to the internal drawing generation section 163.

The internal drawing generation section 163 controls the image synthesizing section 155 to read out the image data in the coordinate range of the frame memory 157 represented by the input range information. The internal drawing generation section 163 stores the image data input from the image synthesizing section 155 in the second memory section 161.

Then, when receiving an operation to paste an image by an operation of the OSD menu displayed as the OSD image 50 or the like, the control unit 130 instructs the internal drawing generation section 163 to paste image data. The position of the frame memory 157 in which the image data is pasted may be a position designated by the user operating the light emitting pen 2 or a preset position.

The internal drawing generation section 163 reads out and outputs the image data stored in the second memory section 161 to the image synthesizing section 155. The internal drawing generation section 163 controls the image synthesizing section 155 to expand the read out image data in the coordinates of the frame memory 157 designated by the control unit 130. Then, the image synthesizing section 155 reads out and outputs the image data expanded in the frame memory 157 to the image projection unit 170, the image projection unit 170 projects an image light corresponding to the input image data on the projection surface 3, and thereby, a copy of the drawing object 40 designated by the operation of the light emitting pen 2 is displayed in a position on the projection surface 3 designated by the operation of the light emitting pen 2.

The delete command refers to a command to delete the display of the selected drawing object 40 from the projection surface 3. When the delete command is selected, the control unit 130 acquires a coordinate range of the frame memory 157 in which the drawing object 40 is expanded with reference to the calibration data. The control unit 130 outputs an instruction to delete the data and range information representing the range of the frame memory 157 to delete data to the internal drawing generation section 163.

The internal drawing generation section 163 controls the image synthesizing section 155 to delete the image data expanded in the range of the frame memory 157 represented by the input range information from the frame memory 157.

Figure 8:
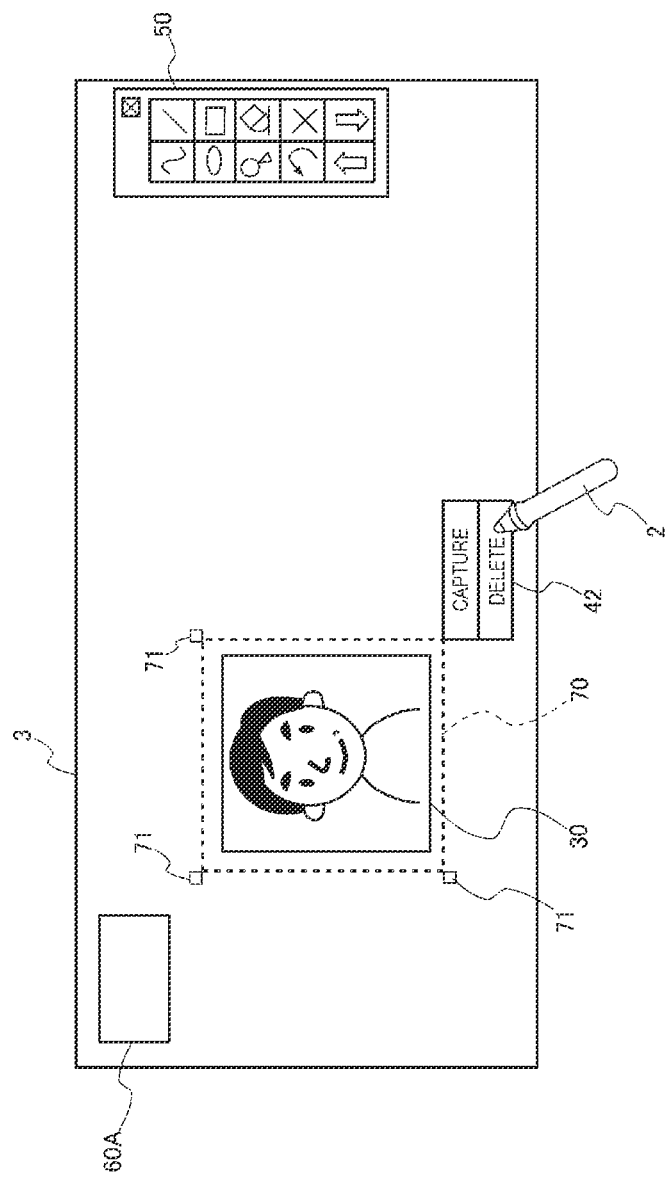
FIG. 8 shows a state in which an image object is selected.

FIG. 8 shows a state in which the image object 30 is selected.

The user encloses the image object 30 desired to be selected with the light emitting pen 2 similarly to the case of selecting the drawing object 40.

When the inside of the trajectory of the pointed position of the light emitting pen 2 detected from the captured images is the display position of the image object 30, the control unit 130 determines that the image object 30 is selected.

The control unit 130 displays the FIG. 70 surrounding the determined image object 30. Further, the control unit 130 displays the operators 71 in the four corners of the FIG. 70 and displays a second operation menu 42. The second operation menu 42 contains operation commands to capture and delete.

The capture command refers to a command to capture the image of the image object 30 in the second memory section 161 and display the captured image as a captured image 80 on the projection surface 3.

When the capture command is selected, the control unit 130 acquires a coordinate range of the frame memory 157 in which the image object 30 is expanded with reference to the calibration data. The control unit 130 outputs an instruction to capture and information of the coordinate range of the frame memory 157 in which the captured image 80 is expanded to the internal drawing generation section 163.

The internal drawing generation section 163 controls the image synthesizing section 155 to generate the image data expanded in the coordinate range of the frame memory 157 represented by the input information of the coordinate range as the image data of the captured image 80 in the second memory section 161. Hereinafter, the image data of the captured image 80 is referred to as "captured data".

Then, the control unit 130 moves the position of the converted image data of the image object 30 as an object to be captured. The position of the frame memory 157 in which the converted image data as the object to be captured is expanded is referred to as "pre-movement position". Further, the position of the frame memory 157 as a movement destination to which the converted image data as the object to be captured is moved is referred to as "post-movement position".

When expanding the captured data in the pre-movement position, the control unit 130 designates a position not overlapping with the expanded captured data and separating from the captured data by a preset setting as the post-movement position.

The internal drawing generation section 163 controls the image synthesizing section 155 to expand the converted image data of the image object 30 in the coordinate range of the frame memory 157 indicated by the input post-movement position.

Then, the control unit 130 instructs to expand the captured data in the pre-movement position. The control unit 130 outputs an instruction to expand the captured data and coordinate information representing the expansion position to the internal drawing generation section 163. The coordinate information representing the expansion position is the position of the frame memory 157 in which the converted image data of the image object 30 as the object to be captured was expanded.

The internal drawing generation section 163 reads out the captured data from the second memory section 161. The internal drawing generation section 163 controls the image synthesizing section 155 to expand the captured data in the pre-movement position of the frame memory 157 in which the converted image data of the image object 30 was expanded.

Figure 9:
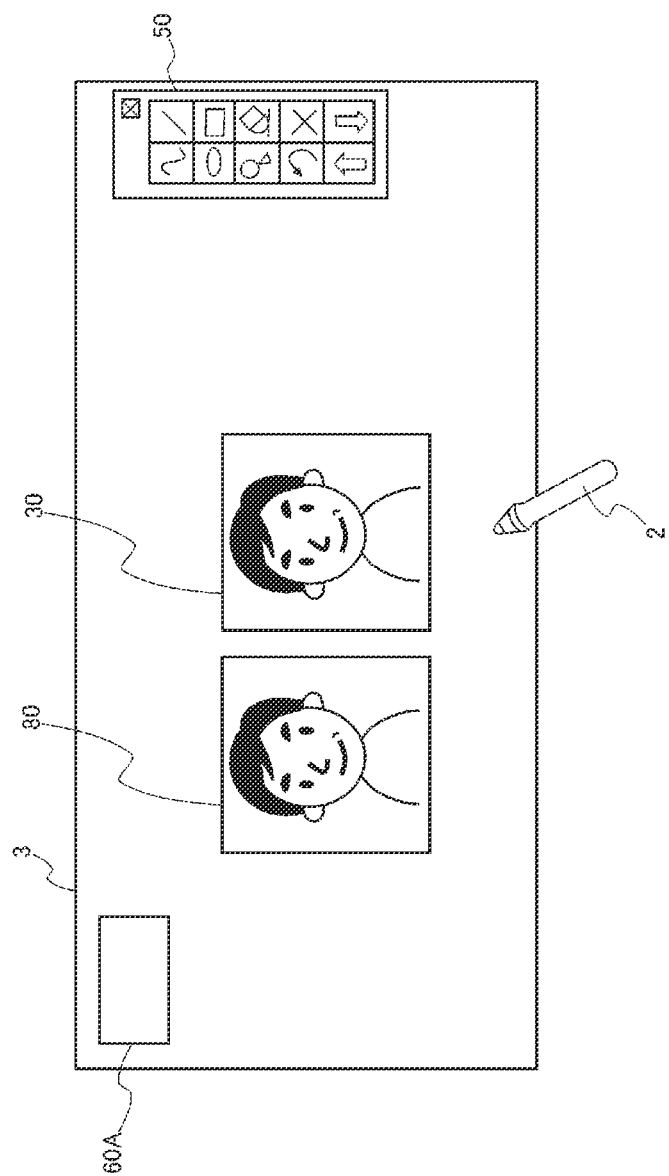
FIG. 9 shows a state in which a captured image and the image object are displayed side by side.

Then, the internal drawing generation section 163 controls the image synthesizing section 155 to read out the image data expanded in the frame memory 157 and outputs the read out image data to the image projection unit 170. The image projection unit 170 projects an image light corresponding to the input image data on the projection surface 3, and thereby, as shown in FIG. 9, the captured image 80 and the image object 30 are displayed side by side. The image object 30 is an image and the captured image 80 is a still image formed by capture of the image.

Figure 10:
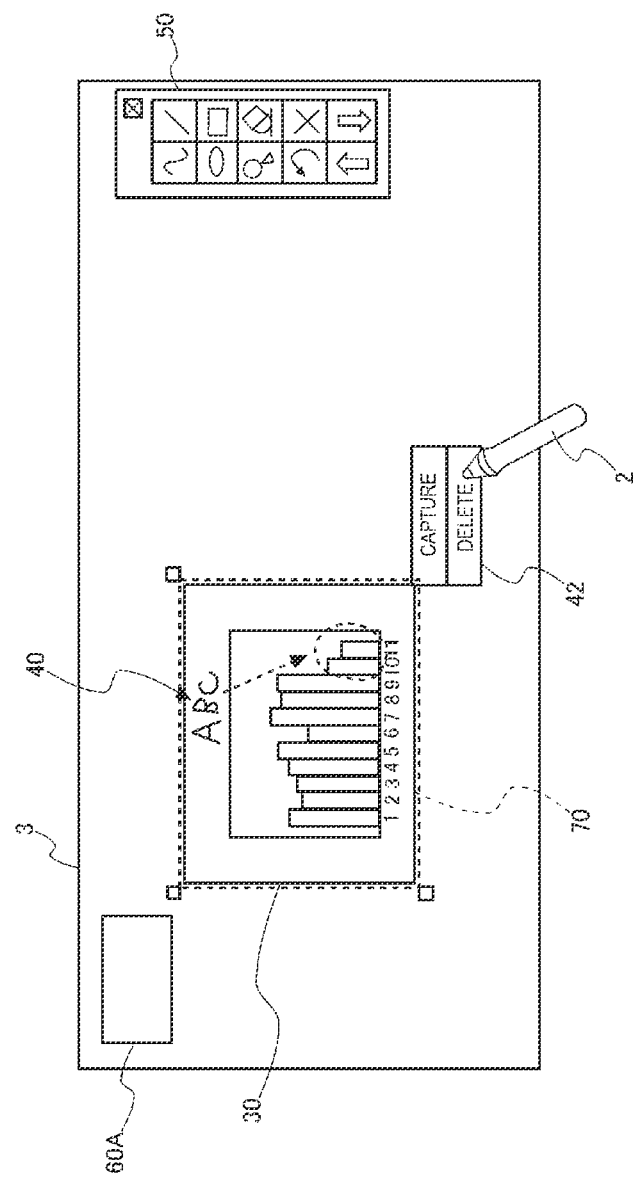
FIG. 10 shows a state in which an image object and a drawing object are selected.

FIG. 10 shows a state in which the image object 30 and the drawing object 40 are selected.

Similarly to the case of selecting the drawing object 40, the user encloses the image object 30 and the drawing object 40 desired to be selected with the light emitting pen 2.

When the inside of the trajectory of the pointed position of the light emitting pen 2 detected from the captured images is the display position of the image object 30 and the drawing object 40, the control unit 130 determines that the image object 30 and the drawing object 40 are selected.

The control unit 130 displays the FIG. 70 surrounding the determined image object 30 and drawing object 40. Further, the control unit 130 displays the operators 71 in the four corners of the FIG. 70 and displays the second operation menu 42. The second operation menu 42 contains operation commands to capture and delete.

When a plurality of objects are selected, the control unit 130 registers the selected plurality of objects in a group.

In the embodiment, a case where the image object 30 and the drawing object 40 are registered in a group will be explained, however, the objects registered in a group may be a plurality of the image objects 30 or a plurality of the drawing objects 40.

Figure 11:
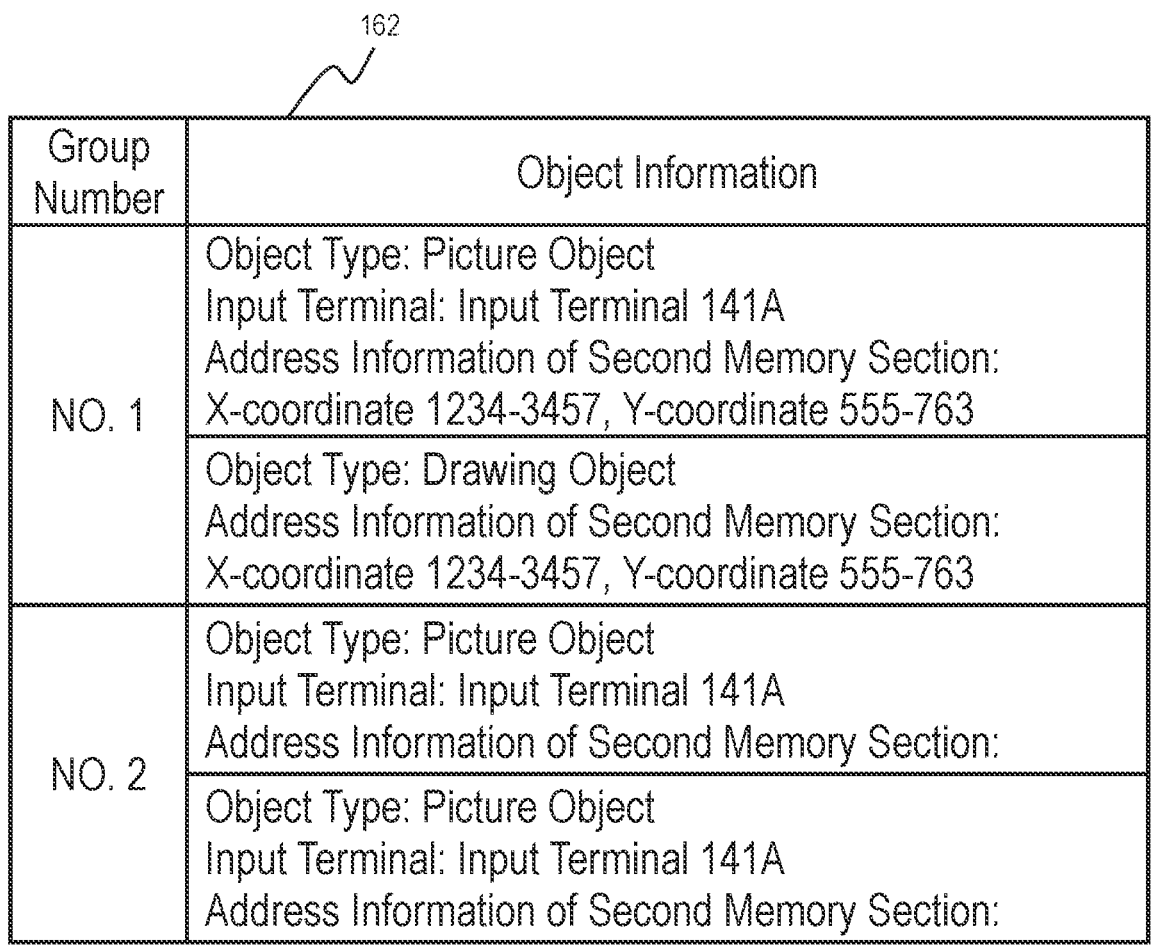
FIG. 11 shows an example of a group management table.

FIG. 11 shows an example of a group management table 162. The control unit 130 generates a group management 162 table and stores the generated group management table 162 in the first memory section 131.

In the group management table 162, group numbers for identification of groups and object information for identification of objects are associated and registered.

When the group-registered object is the image object 30, the object information contains an object type, an input terminal, and address information of the second memory section.

The object type is information representing whether the object is the image object 30 or the drawing object 40. The input terminal is identification information for the input terminals 141A, 141B, 141C receiving the image signals. The address information of the second memory section 161 is an address of the second memory section 161 in which the converted image data extracted from the image signal and reduction-processed by the scaling section 153 is stored.

When the group-registered object is the drawing object 40, the object information includes an object type and address information of the second memory section. The address information of the second memory section is an address of the second memory section 161 in which the drawing data as the source of the drawing object 40 is stored.

When the capture command is selected, the control unit 130 acquires a coordinate range of the frame memory 157 in which the image object 30 and the drawing object 40 are expanded with reference to the calibration data. The control unit 130 outputs an instruction to capture and information representing the coordinate range of the frame memory 157 in which the captured image 80 is expanded to the internal drawing generation section 163.

The internal drawing generation section 163 controls the image synthesizing section 155 to store the image data expanded in the coordinate range of the frame memory 157 represented by the input information of the coordinate range as the captured data in the second memory section 161.

Then, the control unit 130 deletes the drawing object 40 and moves the display position of the image object 30. The drawing object 40 is deleted because the captured data contains the drawing data of the drawing object 40.

The control unit 130 outputs an instruction to delete the drawing object 40 as the object to be captured. Further, the control unit 130 outputs an instruction to move the converted image data as the object to be captured and the coordinate information representing the post-movement position to move the converted image data to the internal drawing generation section 163. When the captured data is expanded in the pre-movement position, the control unit 130 designates a position not overlapping with the expanded captured data and separating from the captured data by a preset setting as the post-movement position.

The internal drawing generation section 163 controls the image synthesizing section 155 to delete the drawing data of the drawing object as the object to be captured from the frame memory 157.

Further, the internal drawing generation section 163 controls the image synthesizing section 155 to expand the converted image data of the image object 30 in the post-movement position of the frame memory 157 represented by the input coordinate information.

Then, the control unit 130 instructs the internal drawing generation section 163 to expand the captured data in the pre-movement position of the converted image data of the image object 30.

The control unit 130 outputs an instruction to expand the captured data and coordinate information representing the expansion position to the internal drawing generation section 163. The coordinate information representing the expansion position is coordinates of the position in which the converted image data of the image object 30 as the object to be captured is expanded.

The internal drawing generation section 163 reads out the captured data from the second memory section 161 and outputs the read out captured data to the image synthesizing section 155. The internal drawing generation section 163 controls the image synthesizing section 155 to expand the captured data in the position of the frame memory 157 in which the converted image data of the image object 30 is expanded.

Figure 12:
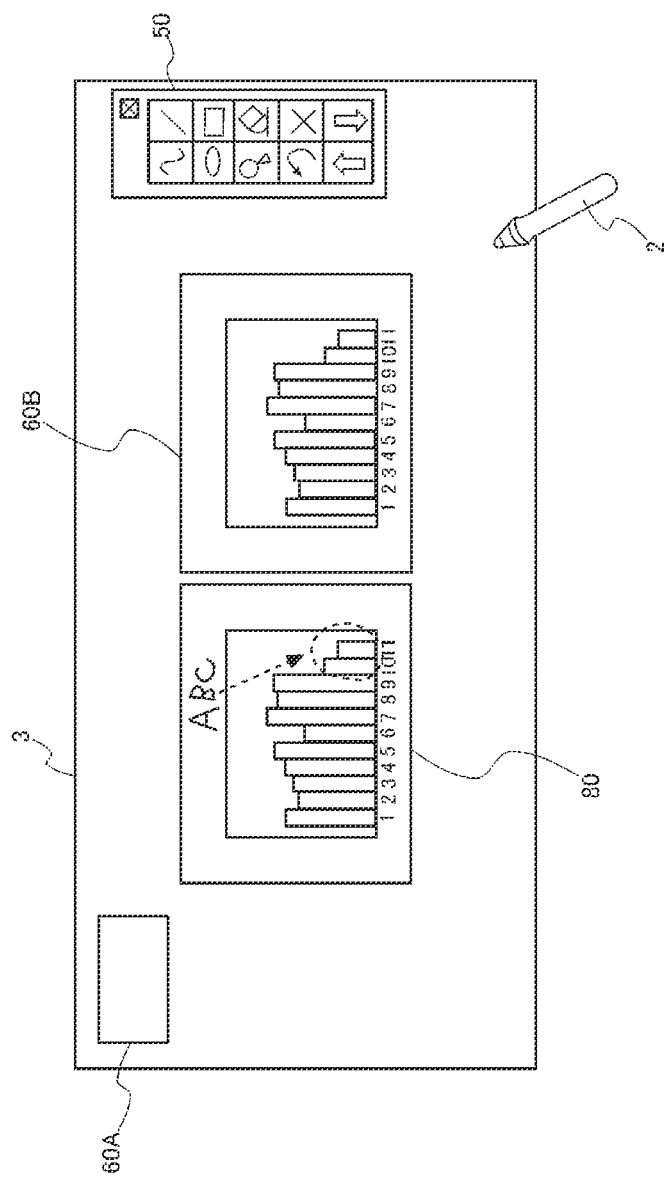
FIG. 12 shows a state in which a captured image, the image object, and the drawing object are selected.

Then, the internal drawing generation section 163 controls the image synthesizing section 155 to read out the image data expanded in the frame memory 157 and outputs the read out image data to the image projection unit 170. The image projection unit 170 projects an image light corresponding to the input image data on the projection surface 3, and thereby, as shown in FIG. 12, the captured image 80, the image object 30, and the drawing object 40 are displayed side by side. The image data of the image object 30 is an image and the captured data is a still image formed by capture of a part of the image. Further, the drawing object 40 is not displayed in a new display position of the image object 30, but displayed with the captured image 80 in the original display position of the image object 30.

When the group-registered objects contain the image object 30, the user may change the image of the group-registered image object 30 to an image based on an image signal supplied from the other image supply apparatus 10 by an operation of the light emitting pen 2.

When the group-registered object is selected by an operation of the light emitting pen 2, an operation command to switch the source is displayed as the second operation menu 42.

When the switch source command is selected by the operation of the light emitting pen 2, the control unit 130 displays the input terminals 141A, 141B, 141C to which the image signals are input in a list. The user selects the input terminal 141A, 141B, 141C to which the image signal desired to be displayed as the image object 30 from the listed input terminals 141A, 141B, 141C by operating the light emitting pen 2.

When one of the input terminals 141A, 141B, 141C is selected, the control unit 130 instructs the internal drawing generation section 163 on the identification information of the selected input terminal 141A, 141B, 141C and to change the image.

The internal drawing generation section 163 reads out the converted image data of the image signal input to the input terminal 141A, 141B, 141C of the input identification information from the second memory section 161. The internal drawing generation section 163 changes the resolution of the read out converted image data.

The internal drawing generation section 163 controls the image synthesizing section 155 to change the converted image data of the image object 30 expanded in the frame memory 157 to the converted image data of the image signal input to the selected input terminal 141A, 141B, 141C. Thereby, the source of the image displayed as the image object 30 on the projection surface 3 is switched.

When a plurality of objects are displayed on the projection surface 3, priorities may be set for these plurality of objects.

The priorities are information for selection of the objects preferentially displayed in portions in which the plurality of objects overlap when the plurality of objects are displayed on the projection surface 3 with overlapping allowed. That is, the object having the first priority is displayed in the portion in which the plurality of objects overlap. Further, when the display position of the object having the first priority is moved, the object for which the second priority is set is displayed in place of the object having the first priority.

When a plurality of objects are registered in a group, the control unit 130 sets the priorities of the plurality of group-registered objects to the same priority. For example, the control unit 130 may set the priorities to the same priority as that of the object having the highest priority of the objects contained in the group. Alternatively, when a plurality of objects are registered in a group, the control unit 130 may set the priorities of the plurality of objects to the first priority.

When the priority of one object of the plurality of objects registered in a group is changed, priorities of the other objects registered in the group are changed to the same priority.

Thereby, the priorities of the group-registered objects may be collectively set. Further, the priorities may be collectively set so that the group-registered objects may be displayed on the other objects or the group-registered objects may be displayed under the other objects.

When the group-registered objects contain the image object 30, the control unit 130 sets an update frequency of the image object 30 higher than an update frequency of the image object 30 not registered in the group. The group-registered image object 30 has a higher attention level of the user. Accordingly, the update frequency of the group-registered image object 30 is set to be higher, and thereby, the image object 30 on which an image based on the latest image signal is reflected may be displayed.

Figure 13:
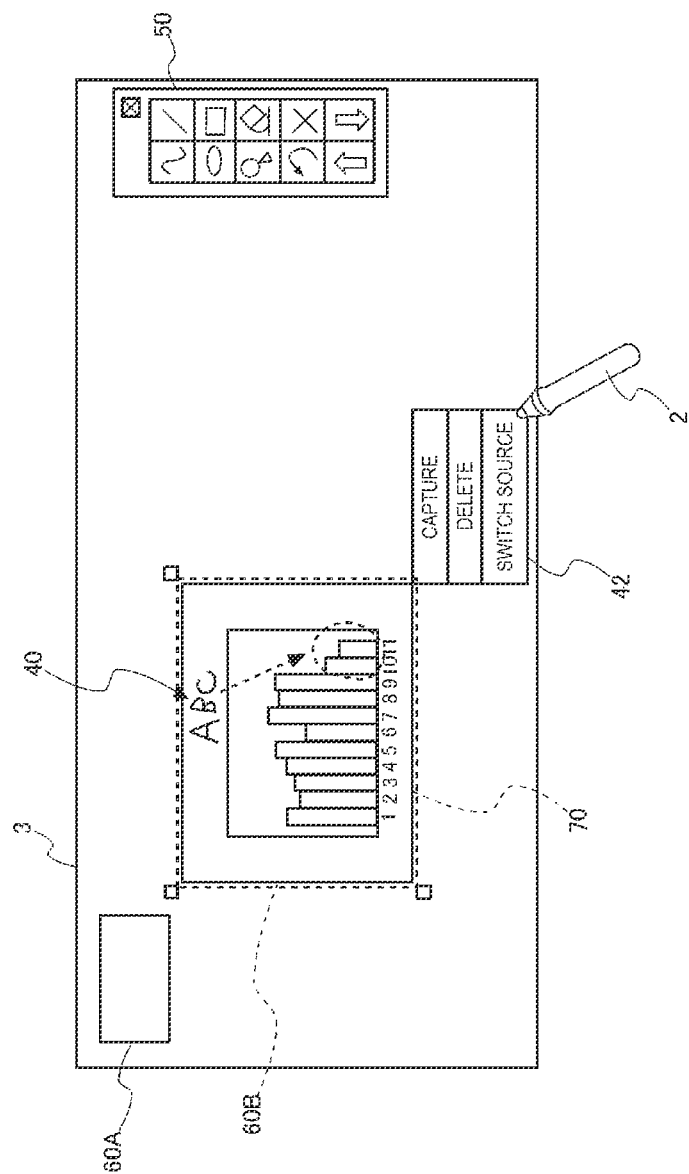
FIG. 13 shows a second operation menu in which "SWITCH SOURCE" is displayed.
Figure 14:
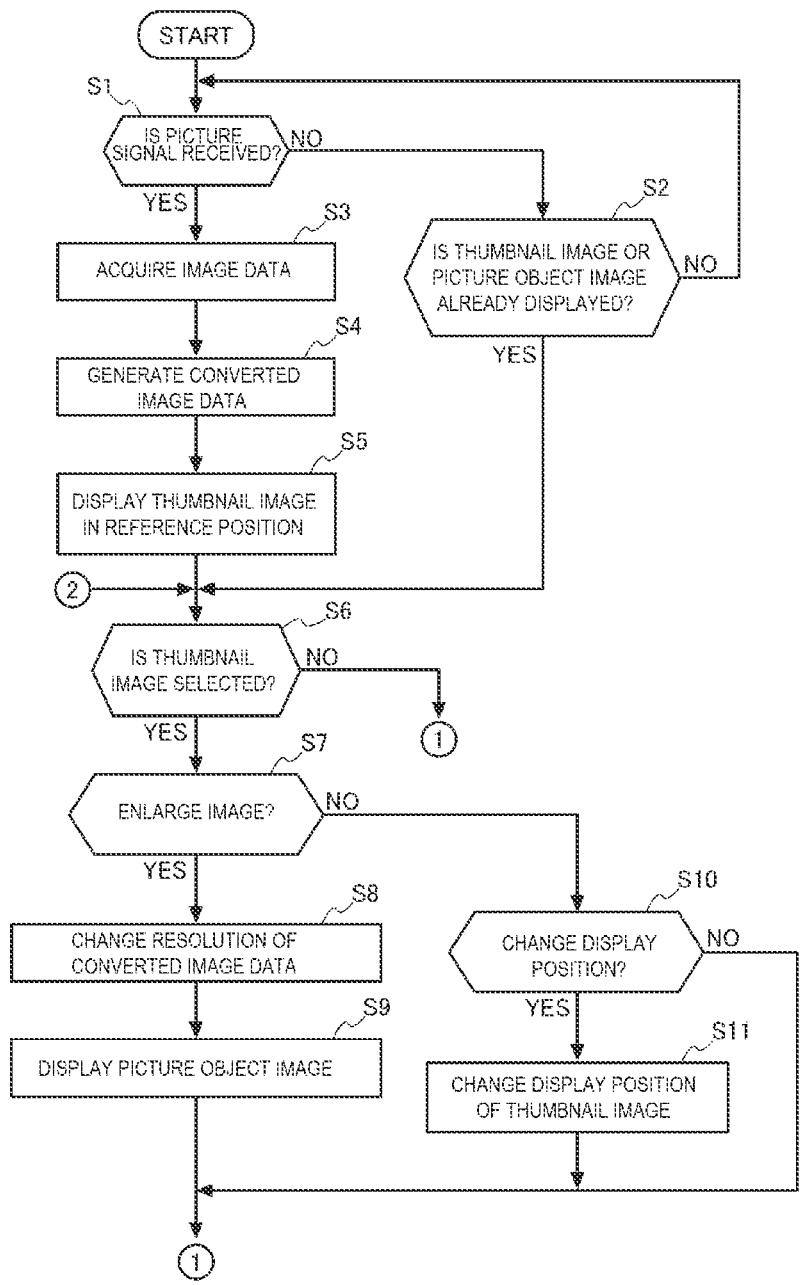
FIG. 14 is a flowchart showing operations of the projector.

FIGS. 13 and 14 are flowcharts showing the entire operation of the projector 100.

The operation of the projector 100 will be explained with reference to the flowcharts in FIGS. 13 and 14.

First, the control unit 130 determines whether or not to receive an image signal (step S1). When not receiving an image signal (step S1/NO), the control unit 130 determines whether or not there is a thumbnail image 60 or an image object 30 already displayed on the projection surface 3 (step S2). When a thumbnail image 60 or an image object 30 is not already displayed on the projection surface 3 (step S2/NO), the control unit 130 returns to the determination at step S1. When a thumbnail image 60 or an image object 30 is already displayed on the projection surface 3 (step S2/YES), the control unit 130 goes to a determination at step S6.

When receiving an image signal (step S1/YES), the control unit 130 controls the signal input unit 140 to acquire image data contained in the image signal (step S3). The signal input unit 140 outputs the acquired image data to the image processing unit 150.

The image processing unit 150 performs image processing on the input image data to adjust brightness, contrast, and a color mode, and then, generates converted image data by reduction processing to decrease resolution of the image data (step S4). The generated converted image data is stored in the second memory section 161.

Then, the control unit 130 controls the internal drawing generation section 163 and the image projection unit 170 to displays a thumbnail image 60 as an image based on the converted image data generated by the image processing unit 150 in a reference position on the projection surface 3 (step S5).

Then, the control unit 130 analyzes captured images and determines whether or not the thumbnail image 60 is selected by the user operating the light emitting pen 2 (step S6). When the thumbnail image 60 is selected (step S6/YES), the control unit 130 determines whether or not to receive an enlarging operation to enlarge the thumbnail image 60 (step S7). When the thumbnail image 60 is not selected (step S6/NO), the control unit 130 goes to processing at step S12 shown in FIG. 14.

When receiving the enlarging operation (step S7/YES), the control unit 130 instructs the internal drawing generation section 163 to designate the converted image data corresponding to the selected thumbnail image 60 and information of the resolution of the converted image data to change. The internal drawing generation section 163 converts the resolution of the converted image data designated by the control unit 130 to the resolution designated by the control unit 130 (step S8). Then, the converted image data with the converted resolution is synthesized with the OSD data and the drawing data by the image synthesizing section 155 and displayed on the projection surface 3 by the image projection unit 170. Thereby, the image object 30 enlarged to the size designated by the user is displayed on the projection surface 3 (step S9).

Then, when the received operation is not the enlarging operation (step S7/NO), but an operation to change the display position of the thumbnail image 60 (step S10/YES), the control unit 130 performs the following operation. The control unit 130 specifies a movement direction and a movement amount of the light emitting pen 2 using the captured images and instructs the internal drawing generation section 163 to designate the converted image data corresponding to the selected image object 30 and information of the movement direction and the movement amount to move the converted image data. The internal drawing generation section 163 controls the image synthesizing section 155 to move the converted image data to coordinates of the frame memory 157 corresponding to the movement direction and the movement amount designated by the control unit 130. Then, the image synthesizing section 155 expands the converted image data in the coordinates of the frame memory 157 represented by the coordinate information designated by the internal drawing generation section 163, and thereby, the display position of the thumbnail image 60 displayed on the projection surface 3 is changed (step S11).

Then, the control unit 130 determines whether or not an object is selected by an operation of the light emitting pen 2 (step S12). The object includes the image object 30 and the drawing object 40. When the object is not selected (step S12/NO), the control unit 130 returns to the determination at step S6.

When the object is selected (step S12/YES), the control unit 130 determines whether or not the selected object is an object registered in a group (step S13). When the selected object is an object registered in a group (step S13/YES), the control unit 130 goes to a determination at step S17.

When the selected object is an object not registered in a group (step S13/NO), the control unit 130 determines whether or not a plurality of objects are selected in the determination at step S12 (step S14). When a plurality of objects are not selected (step S14/NO), the control unit 130 goes to the determination at step S17.

When a plurality of objects are selected, the control unit 130 registers information on the selected plurality of objects in the group management table 162 and registers the selected plurality of objects in a group (step S15). Then, the control unit 130 sets priorities of the plurality of objects registered in the group to a first priority (step S16).

Then, the control unit 130 determines whether or not the object selected at step S12 contains the image object 30 (step S17). When the selected object does not contain the image object 30 (step S17/NO), the control unit 130 displays the first operation menu 41 (step S18).

The control unit 130 determines whether or not "DUPLICATE" contained in the first operation menu 41 is selected (step S19). When "DUPLICATE" is not selected (step S19/NO), the control unit 130 goes to processing at step S31. The processing at step S31 will be described later.

When "DUPLICATE" is selected (step S19/YES), the control unit 130 stores drawing data as a source of the drawing object 40 in the second memory section 161 (step S20). Then, the control unit 130 determines whether or not to receive an operation to designate a display position in which drawing data for which duplication is generated is displayed (step S21). When receiving the operation to designate the display position (step S21/YES), the control unit 130 expands the drawing data in coordinates of the frame memory 157 corresponding to the designated display position (step S22). Then, the control unit 130 goes to a determination at step S32. The determination at step S32 will be described later.

Further, at step S17, when determining that the image object is contained (step S17/YES), the control unit 130 displays the second operation menu 42 (step S23). The control unit 130 determines whether or not "CAPTURE" contained in the second operation menu 42 is selected (step S24). When "CAPTURE" is selected (step S24/YES), the control unit 130 captures image data as a source of the selected object or the image data and drawing data and generates captured data (step S25).

Then, the control unit 130 deletes the image data as the source of the captured data or the image data and the drawing data from the frame memory 157 (step S26). The control unit 130 expands the captured data in a position in which the deleted image data or image data and drawing data was expanded (step S27). Further, the control unit 130 expands the image data as the source of the captured data on the right side adjacent to the position in which the captured data is expanded (step S28).

When "CAPTURE" is not selected in the determination at step S24 (step S24/NO), the control unit 130 determines whether or not "SWITCH SOURCE" is selected (step S28). When "SWITCH SOURCE" is selected (step S28/YES), the control unit 130 displays the input terminals 141A, 141B, 141C receiving the image signals in a list. The user selects the input terminal 141A, 141B, 141C to which the image signal desired to be displayed as the image object 30 is input from the listed input terminals 141A, 141B, 141C by operating the light emitting pen 2.

When the input terminal 141 is selected (step S29), the control unit 130 reads out the converted image data formed by reduction processing of the image data extracted from the image signal received by the selected input terminal 141 from the second memory section 161. The control unit 130 converts the resolution of the read out converted image data and displays an image based on the converted image data with the converted resolution as the selected image object 30 (step S30).

When the determination at step S28 is a negative determination, the control unit 130 executes processing corresponding to the selected operation menu (step S31). Then, the control unit 130 determines to receive an ending operation (step S32). When not receiving the ending operation (step S32/NO), the control unit 130 goes to the determination at step 36. When receiving the ending operation (step S32/YES), the control unit 130 ends the processing flow.

As described above, the projector 100 of the embodiment displays the image object 30 as the image based on the input image signal on the projection surface 3. Further, the projector 100 detects the operation of the light emitting pen 2 on the projection surface 3 and displays the drawing object 40 as the image corresponding to the detected operation on the projection surface 3.

When receiving an operation to select the image object 30 and the drawing object 40, the projector 100 registers the selected image object 30 and drawing object 40 in a group.

When receiving an instruction on the image object 30 and the drawing object 40 registered in the group, the projector 100 executes processing corresponding the instruction on the image and drawing.

Therefore, the selected image object 30 and drawing object 40 may be processed as one group. Accordingly, operations to move and enlarge and reduce the selected image object 30 and drawing object 40 may be collectively performed. Thus, convenience of the user may be improved.

When the drawing object 40 is selected, the projector 100 displays the first operation menu 41 having the operation commands corresponding to the drawing object 40 as an operation menu.

When the image object 30 is selected, the projector 100 displays the second operation menu 42 having the operation commands corresponding to the image object 30 unlike the first operation menu 41 as an operation menu.

When the image object 30 and the drawing object 40 registered in a group are selected, the projector 100 displays the second operation menu 42 as an operation menu.

Therefore, when the image object 30 is contained in the objects registered in a group, the second operation menu 42 having the operation commands corresponding to the image object 30 may be displayed. Accordingly, even when the image object 30 is registered in a group, operability for the image object 30 may be maintained.

When a first image signal and a second image signal are input as image signals, the projector 100 displays a first image based on the first image signal and a second image based on the second image signal on the projection surface 3.

When receiving an operation to select the image object 30 based on the first image signal and the drawing object 40 each displayed on the projection surface 3, the projector 100 registers the selected image object 30 based on the first image signal and the selected drawing object 40 in a group.

The projector 100 sets an update frequency of the image object 30 based on an image signal registered in a group to be higher than an update frequency of the image object 30 based on an image signal not registered in a group.

The grouped image object 30 has a higher attention level of the user. Accordingly, the image object 30 on which an image based on the latest image signal is reflected may be displayed.

The second operation menu 42 contains a changing operation to change an image signal as a source of an image to another image signal. When the changing operation is selected, the projector 100 receives an operation to select the image signal as the source of the image.

The projector 100 displays an image based on a selected image signal as an image registered in a group.

Therefore, the image signal as the source of the image registered in the group may be changed by the simple operation.

The above described embodiment is a preferred embodiment of the present disclosure. Note that, not limited to the above described embodiment, but various modifications can be made without departing from the scope of the present disclosure.

For example, the I/F circuit 143, the image processing unit 150, and the internal drawing generation section 163 may be formed using one or more processors or the like. Further, the I/F circuit 143, the image processing unit 150, and the internal drawing generation section 163 may be formed using dedicated processing devices such as ASIC (Application Specific Integrated Circuit) and FPGA (Field Programmable Gate Array).

Further, in the above described embodiment, the light modulation element of the light modulation device 173 may be a transmissive liquid crystal panel or a reflective liquid crystal panel. Alternatively, the light modulation element may have a configuration using a digital mirror device or a configuration combining a digital mirror device and a color wheel. Alternatively, the light modulation device 173 may employ another configuration that can modulate the light emitted by the light source than the liquid crystal panel and the DMD.

The respective functional units of the projector 100 shown in FIG. 2 show the functional configurations, but the specific mounting forms are not particularly limited. That is, hardware individually corresponding to the respective functional units is not necessarily mounted and, obviously, the functions of the plurality of functional units can be realized by a single processor executing programs. In the above described embodiment, part of the functions realized by software may be realized by hardware or part of the functions realized by hardware may be realized by software. In addition, any changes can be made to the specific detailed configurations of the other respective parts of the projector without departing from the scope of the present disclosure.

Figure 15:
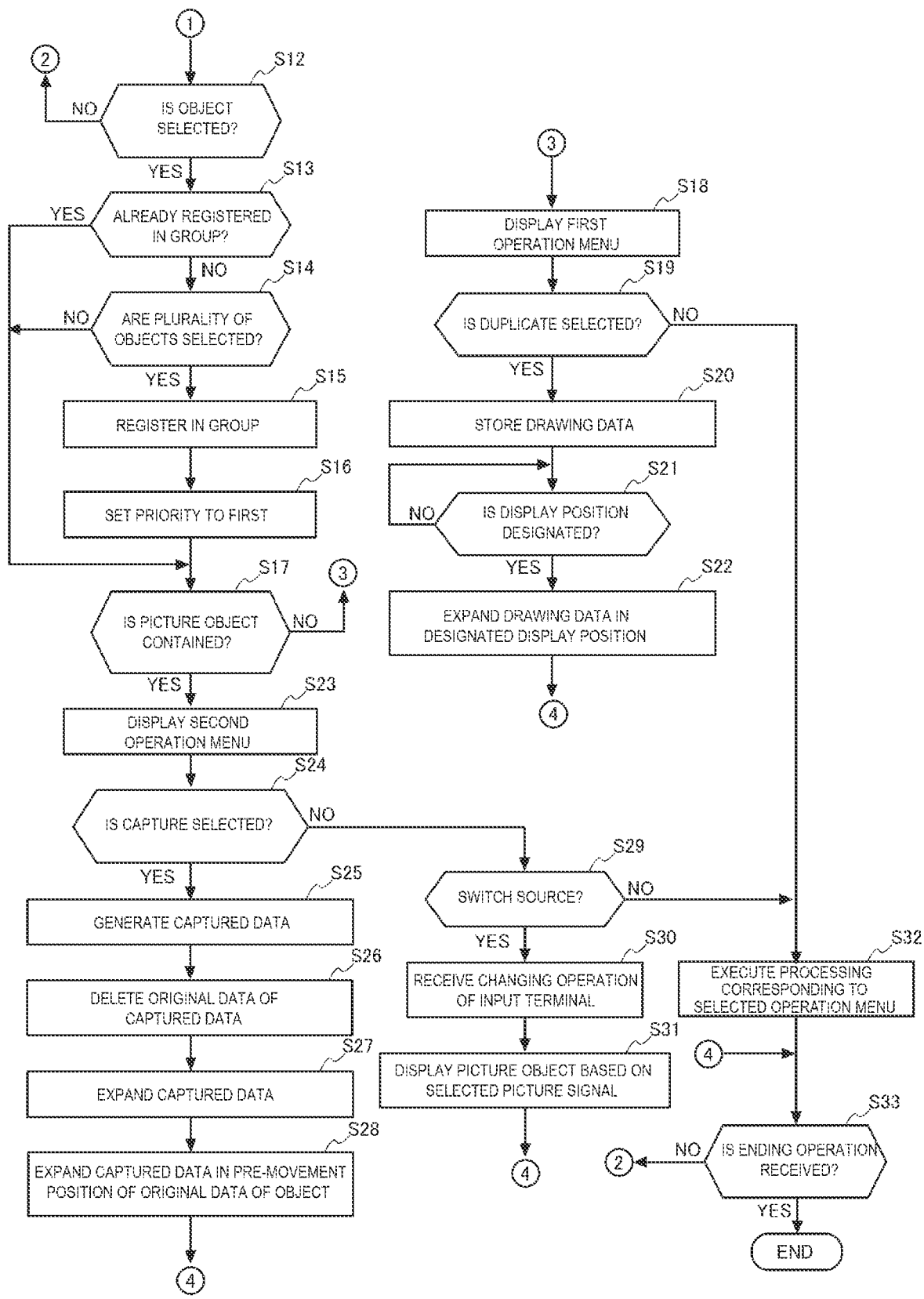
FIG. 15 is a flowchart showing operations of the projector.

The units of processing of the flowcharts shown in FIGS. 14 and 15 are formed by division according to the main parts of the processing for easy understanding of the processing by the projector 100. The present disclosure is not limited by the way of division and the names of the units of processing shown in the flowcharts in FIGS. 14 and 15. The processing by the control unit 130 may be divided into more units of processing according to the parts of the processing or divided so that a single unit of processing may contain more pieces of processing. The processing procedures of the above described flowcharts are not limited to the illustrated examples.

When the control method for the display apparatus is realized using the computer of the projector 100, the program to be executed by the computer can be configured in a form of a recording medium or a transmission medium transmitting the program. For the recording medium, a magnetic optical recording medium or a semiconductor memory device may be used. Specifically, a portable or fixed recording medium such as a flexible disc, an HDD (Hard Disk Drive), a CD-ROM, a DVD, a Blu-ray Disc, a magnetooptical disc, a flash memory, and a card-type recording medium may be used. Alternatively, the recording medium may be a nonvolatile memory device such as a RAM, a ROM, and an HDD as internal memory devices provided in a server apparatus. The Blu-ray is a registered trademark.

What is claimed is:

1. A control method for a display apparatus comprising:
   displaying a first image based on an input first image signal on a display surface;
   when a first operation on the display surface is detected, displaying a first drawing image corresponding to the first operation on the display surface, wherein detecting the first operation comprises detecting a first emission sequence from a light emitting pen, wherein the first image has a first priority and the first drawing image has a second priority;
   when a second operation to select the first image and the first drawing image on the display surface is received, registering the first image and the first drawing image as a first group, wherein detecting the second operation comprises detecting a second emission sequence from the light emitting pen, wherein the first group has a higher update frequency than displayed objects not in the first group, and wherein registering the first image and the first drawing image as the first group includes setting the first priority and the second priority to a same priority value; and
   when a third operation to select the first group on the display surface is received, executing first processing corresponding to the third operation, wherein detecting the third operation comprises detecting a third emission sequence from the light emitting pen.

2. The control method for the display apparatus according to claim 1, further comprising:
   when a fourth operation on the display surface is detected, displaying a second drawing image corresponding to the fourth operation on the display surface, wherein detecting the fourth operation comprises detecting a fourth emission sequence from the light emitting pen;
   in a case where the first image and the first drawing image are not registered as the first group, when the second drawing image is selected, displaying a first operation menu having a first operation command; and
   displaying a second image based on an input second image signal on the display surface; and
   when the second image is selected, displaying a second operation menu having a second operation command different from the first operation command, wherein
   the first processing including displaying the second operation menu.

3. The control method for the display apparatus according to claim 2, wherein
   the second operation menu includes a changing operation to change the first image signal to a third image signal, and
   when the changing operation is selected, a third image based on the third image signal is displayed in a position in which the first image was displayed.

4. A display apparatus comprising:
   a light source; and
   at least one processor programmed to
      display a first image based on a first image signal on a display surface using the light source,
      when a first operation on the display surface is detected, display a first drawing image corresponding to the first operation on the display surface using the light source, wherein detecting the first operation comprises detecting a first emission sequence from a light emitting pen, wherein the first image has a first priority and the first drawing image has a second priority, when a second operation to select the first image and the first drawing image displayed on the display surface is received, register the first image and the first drawing image as a first group, wherein detecting the second operation comprises detecting a second emission sequence from the light emitting pen, wherein the first group has a higher update frequency than displayed objects not in the first group, and wherein registering the first image and the first drawing image as the first group includes setting the first priority and the second priority to a same priority value, and when a third operation to select the first group is received, executes first processing corresponding to the third operation, wherein detecting the third operation comprises detecting a third emission sequence.

\* \* \* \* \*